(12) United States Patent
Brosnan

(10) Patent No.: US 6,977,645 B2
(45) Date of Patent: Dec. 20, 2005

(54) PORTABLE ELECTRONIC DEVICE WITH MOUSE-LIKE CAPABILITIES

(75) Inventor: Michael John Brosnan, Fremont, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 638 days.

(21) Appl. No.: 09/811,001

(22) Filed: Mar. 16, 2001

(65) Prior Publication Data

US 2002/0130835 A1  Sep. 19, 2002

(51) Int. Cl.$^7$ ............................................. G09G 5/08
(52) U.S. Cl. ..................... 345/166; 345/157; 345/175; 382/188; 382/189; 382/313; 715/810; 715/863
(58) Field of Search ................................ 345/156, 157, 345/158, 160, 163, 165, 166, 173, 175–176, 345/810–811, 817–823, 831, 845; 250/208.1–208.3, 250/566; 382/188–189, 313

(56) References Cited

U.S. PATENT DOCUMENTS

| | | | |
|---|---|---|---|
| 4,920,260 A * | 4/1990 | Victor et al. ................. | 250/221 |
| 5,578,813 A | 11/1996 | Allen et al. | |
| 5,644,139 A | 7/1997 | Allen et al. | |
| 5,701,141 A * | 12/1997 | Schmenk et al. ............ | 345/157 |
| 5,786,804 A | 7/1998 | Gordon | |
| 5,801,681 A * | 9/1998 | Sayag ......................... | 345/157 |
| 5,909,209 A * | 6/1999 | Dickinson ................... | 345/163 |
| 5,977,975 A * | 11/1999 | Mugura et al. ............. | 345/822 |
| 5,994,710 A | 11/1999 | Knee et al. | |
| 6,057,540 A | 5/2000 | Gordon et al. | |
| 6,151,015 A | 11/2000 | Badyal et al. | |
| 6,208,342 B1 * | 3/2001 | Mugura et al. ............. | 345/810 |
| 6,249,606 B1 * | 6/2001 | Kiraly et al. ............... | 382/195 |
| 6,281,882 B1 * | 8/2001 | Gordon et al. ............. | 345/166 |
| 6,373,047 B1 * | 4/2002 | Adan et al. ................. | 250/221 |
| 6,392,632 B1 * | 5/2002 | Lee ............................. | 345/158 |
| 2001/0017934 A1 * | 8/2001 | Paloniemi et al. .......... | 382/107 |
| 2002/0130841 A1 * | 9/2002 | Scott ........................... | 345/166 |

OTHER PUBLICATIONS

"Seeing Eye" Mouse for a Computer System, U.S. Appl. 09/052,046, filed Mar. 30, 1998.

* cited by examiner

Primary Examiner—Henry N. Tran

(57) ABSTRACT

A portable electronic device includes a menu display having a plurality of menu items, and a menu item pointer movable by a user to highlight particular menu items. The portable electronic device includes a motion sensor for sensing relative movement between the portable electronic device and an imaging surface. The motion sensor is configured to generate a first set of movement data indicating a first relative movement between the portable electronic device and the imaging surface. The motion sensor is configured to generate a second set of movement data indicating a second relative movement between the portable electronic device and the imaging surface. A controller is configured to move the menu item pointer based on the first set of movement data to highlight a first menu item. The controller is configured to select the first menu item based on the second set of movement data.

22 Claims, 4 Drawing Sheets

PORTABLE ELECTRONIC DEVICE WITH MOUSE-LIKE CAPABILITIES

REFERENCE TO RELATED PATENTS

This Application is related to the subject matter described in the following U.S. patents: U.S. Pat. No. 5,578,813, filed Mar. 2, 1995, issued Nov. 26, 1996, and entitled FREEHAND IMAGE SCANNING DEVICE WHICH COMPENSATES FOR NON-LINEAR MOVEMENT; U.S. Pat. No. 5,644,139, filed Aug. 14, 1996, issued Jul. 1, 1997, and entitled NAVIGATION TECHNIQUE FOR DETECTING MOVEMENT OF NAVIGATION SENSORS RELATIVE TO AN OBJECT; and U.S. Pat. No. 5,786,804, filed Oct. 6, 1995, issued Jul. 28, 1998, and entitled METHOD AND SYSTEM FOR TRACKING ATTITUDE. These three patents describe techniques of tracking position movement. Those techniques are a component in a preferred embodiment described below. Accordingly, U.S. Pat. Nos. 5,578,813, 5,644,139, and 5,786,804 are hereby incorporated herein by reference.

This application is also related to the subject matter described in U.S. Pat. No. 6,057,540, filed Apr. 30, 1998, issued May 2, 2000, and entitled MOUSELESS OPTICAL AND POSITION TRANSLATION TYPE SCREEN POINTER CONTROL FOR A COMPUTER SYSTEM; U.S. Pat. No. 6,151,015, filed Apr. 27, 1998, issued Nov. 21, 2000, and entitled PEN LIKE COMPUTER POINTING DEVICE; and U.S. patent application Ser. No. 09/052,046, filed Mar. 30, 1998, entitled SEEING EYE MOUSE FOR A COMPUTER SYSTEM. These two related patents and patent application describe screen pointing devices based on the techniques described in U.S. Pat. Nos. 5,578,813, 5,644,139, and 5,786,804. Therefore, U.S. Pat. Nos. 6,057,540 and 6,151,015, and U.S. patent application Ser. No. 09/052,046, filed Mar. 30, 1998, entitled SEEING EYE MOUSE FOR A COMPUTER SYSTEM, are hereby incorporated herein by reference.

THE FIELD OF THE INVENTION

This invention relates generally to portable electronic devices. This invention relates more particularly to a portable electronic device with mouse-like capabilities for controlling a pointer on a display screen of the electronic device.

BACKGROUND OF THE INVENTION

The use of a hand operated pointing device for use with a computer and its display has become almost universal. By far the most popular of the various devices is the conventional (mechanical) mouse, used in conjunction with a cooperating mouse pad. Centrally located within the bottom surface of the mouse is a hole through which a portion of the underside of a rubber-surfaced steel ball extends. The mouse pad is typically a closed cell foam rubber pad covered with a suitable fabric. Low friction pads on the bottom surface of the mouse slide easily over the fabric, but the rubber ball does not skid. Rather, the rubber ball rolls over the fabric as the mouse is moved. Interior to the mouse are rollers, or wheels, that contact the ball at its equator and convert its rotation into electrical signals representing orthogonal components of mouse motion. These electrical signals are coupled to a computer, where software responds to the signals to change by a $\Delta X$ and a $\Delta Y$ the displayed position of a pointer (cursor) in accordance with movement of the mouse. The user moves the mouse as necessary to get the displayed pointer to a desired location or position. Once the pointer on the screen points at an object or location of interest, a button on the mouse is activated with the fingers of the hand holding the mouse. The activation serves as an instruction to take some action, the nature of which is defined by software in the computer.

In addition to mechanical types of pointing devices like a conventional mouse, optical pointing devices have also been developed, such as those described in the incorporated patents and patent application. In one form of an optical pointing device, rather than using a moving mechanical element like a ball in a conventional mouse, relative movement between an imaging surface, such as a finger or a desktop, and photo detectors within the optical pointing device, is optically sensed and converted into movement information.

For portable electronic devices, such as cellular telephones, personal digital assistants (PDAs), digital cameras, portable game devices, pagers, portable music players (e.g., MP3 players), and other devices, it may be undesirable to use an external pointing device, such as a mechanical mouse or an optical mouse, coupled to the device. It is often inconvenient to carry around the additional equipment. And with a mechanical pointing device like a mouse, it may be difficult to find a suitable surface on which to operate the mouse.

Some portable electronic devices include built-in screen pointing devices. For example, some cellular telephones include arrow keys that allow a highlight bar to be moved around on a display screen to highlight menu items, such as names or telephone numbers. Once a menu item has been highlighted, the menu item is typically selected by pressing another key on the cellular telephone. Using multiple arrow keys to highlight and select menu items is inefficient and time consuming, particularly for users who are more familiar with operating other types of screen pointing devices, such as a mouse or trackball, or an optical pointing device.

It would be desirable to essentially turn a portable electronic device into a mouse. By providing mouse-like capabilities to a portable electronic device, the device could be operated in a manner similar to a conventional mouse, but without the inconvenience of carrying around additional equipment. It would also be desirable to incorporate security features into the electronic device, so that certain patterns of movement of the electronic device could be detected, and used to identify or verify a particular user.

SUMMARY OF THE INVENTION

One form of the present invention provides a method of controlling menu item selection in a portable electronic device. The portable electronic device includes a menu display having a plurality of menu items and a menu item pointer movable by a user to highlight particular menu items. Relative movement between the portable electronic device and an imaging surface is sensed. A first set of movement data is generated indicating a first relative movement between the portable electronic device and the imaging surface. The menu item pointer is moved based on the first set of movement data to highlight a first menu item. A second set of movement data is generated indicating a second relative movement between the portable electronic device and the imaging surface. The first menu item is selected based on the second set of movement data.

Another form of the present invention provides a portable electronic device including a menu display having a plurality of menu items, and a menu item pointer movable by a user to highlight particular menu items. The portable electronic device includes a motion sensor for sensing relative movement between the portable electronic device and an imaging surface. The motion sensor is configured to generate a first set of movement data indicating a first relative movement between the portable electronic device and the imaging surface. The motion sensor is configured to generate a second set of movement data indicating a second relative movement between the portable electronic device and the imaging surface. A controller is configured to move the menu item pointer based on the first set of movement data to highlight a first menu item. The controller is configured to select the first menu item based on the second set of movement data.

Another form of the present invention provides a method of identifying the user of a portable electronic device. Movement pattern data representing a first pattern of relative movement between the portable electronic device and an imaging surface is stored. Relative movement between the portable electronic device and an imaging surface is sensed. A first set of motion data is generated based on the sensed relative movement. The first set of motion data represents a second pattern of relative movement between the portable electronic device and an imaging surface. The first set of motion data is compared to the stored movement pattern data. The user of the portable electronic device is identified based on the comparison of the first set of motion data to the stored movement pattern data.

Another form of the present invention provides a portable electronic device having a capability to identify a current user of the device. The device includes a memory for storing movement pattern data representing a first pattern of relative movement between the portable electronic device and an imaging surface. A motion sensor generates a first set of motion data representing a second pattern of relative movement between the portable electronic device and an imaging surface. A controller compares the first set of motion data to the stored movement pattern data. The controller is configured to identify the user of the portable electronic based on the comparison of the first set of motion data to the stored movement pattern data.

Another form of the present invention provides a portable electronic device including a memory for storing movement pattern data representing a first pattern of relative movement between the portable electronic device and an imaging surface. A motion detector generates a first set of motion data representing a second pattern of relative movement between the portable electronic device and an imaging surface. A controller compares the first set of motion data to the stored movement pattern data. The controller is configured to enable operation of the portable electronic device if the first set of motion data matches the stored movement pattern data.

DESCRIPTION OF THE PREFERRED EMBODIMENTS

In the following detailed description of the preferred embodiments, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1A:
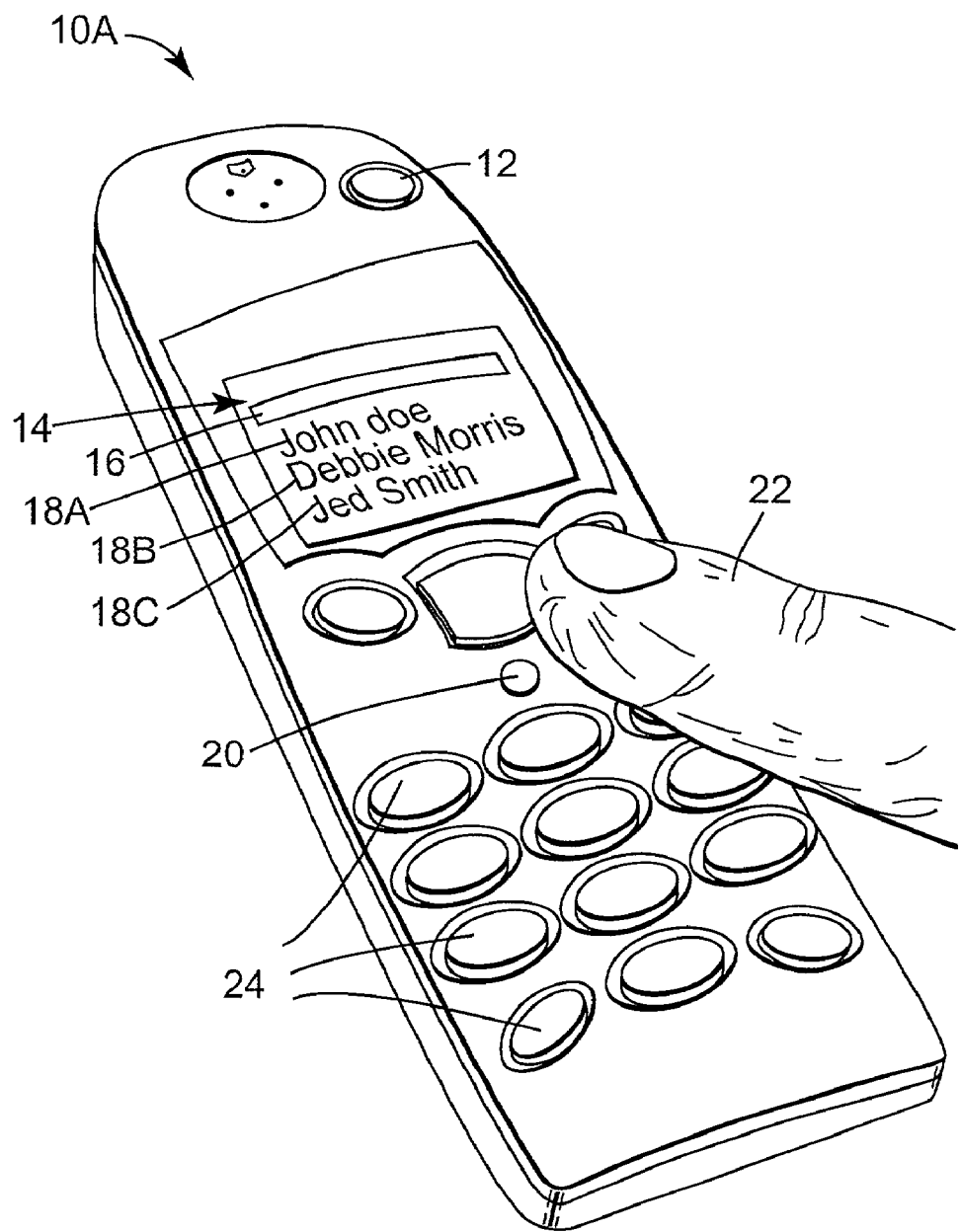
FIG. 1A is a perspective view of one embodiment of cellular telephone with an optical, motion translation type screen pointer device positioned on a front side of the telephone.

FIG. 1A is a perspective view illustrating a front surface of a portable electronic device according to one embodiment of the present invention. In the embodiment shown in FIG. 1A, portable electronic device 10A is a cellular telephone. In an alternative embodiment, device 10A may be any type of portable electronic device having a display screen, including a personal digital assistant (PDA), digital camera, portable game device, pager, portable music player, or other device. When referring to a particular portable electronic device herein, the reference numeral "10" with an appended letter is used. When referring generally to portable electronic devices according to embodiments of the present invention, the reference number "10" with no appended letter is used.

Cellular telephone 10A includes power button 12, display screen 14, highlight bar 16, menu items 18A–18C (collectively referred to as menu 18), motion detection device 20, and a plurality of pushbuttons 24. Pushbuttons 24 are also referred to as keypad 24. A user turns cellular telephone 10A on/off using power button 12. A menu 18, including a plurality of menu items 18A–18C, is displayed to a user on display screen 14. In one embodiment, menu items 18A–18C are names or phone numbers. For menu items 18A–18C that are names, cellular telephone 10A stores an associated telephone number for each such name.

A user highlights a particular one of the menu items 18A–18C by moving highlight bar 16. In one embodiment, highlight bar 16 is moved by rubbing finger 22 against motion detection device 20. If finger 22 is moved upward against motion detection device 20, highlight bar 16 moves upward through menu items 18A–18C. If finger 22 is moved downward against motion detection device 20, highlight bar 16 moves downward through menu items 18A–18C. After a desired one of the menu items 18A–18C has been highlighted with highlight bar 16, the highlighted menu item is then selected. In one embodiment, a highlighted menu item is selected by moving finger 22 against motion detection device 20 in either a leftward or rightward direction. After a highlighted menu item has been selected by a user, cellular telephone 10A automatically dials the selected phone number, or the phone number associated with the selected name.

In one embodiment, an alternative technique is used to select highlighted menu items, such as pushing a button on keypad 24 or tapping on motion detection device 20. However, when a user removes finger 22 from motion detection device 20 to push one of pushbuttons 24 or tap on motion detection device 20, the user may accidentally cause additional movement across motion detection device 20, thereby causing a different menu item to be selected. By selecting menu items 18A–18C with rightward or leftward movement across motion detection device 20, the user need not remove the user's finger 22 from motion detection device 20 to select a desired menu item, which allows the user to select desired menu items more quickly and accurately.

The present invention is not limited to using upward and downward motion to highlight menu items, and using leftward and rightward motion to select menu items. Rather, the techniques described herein may be adapted to any type of menu system. For example, in one embodiment, after highlighting a menu item, a leftward motion causes one action to be taken, such as dialing the phone number, and a rightward motion causes a different action to be taken, such as allowing the user to edit the phone number or name. Velocity, acceleration and repetition of motion of finger 22 against motion detection device 20 is also taken into account in one form of the present invention to expand the number of actions that can be invoked. Further, for a menu system that provides leftward and rightward scrolling, leftward and rightward motion across motion detection device 20 would cause menu items to be highlighted, and upward or downward motion across motion detection device 20 would cause highlighted menu items to be selected. It will also be understood that other types of screen pointers may be used rather than a highlight bar 16, such as an arrow or other movable indicator.

Figure 1B:
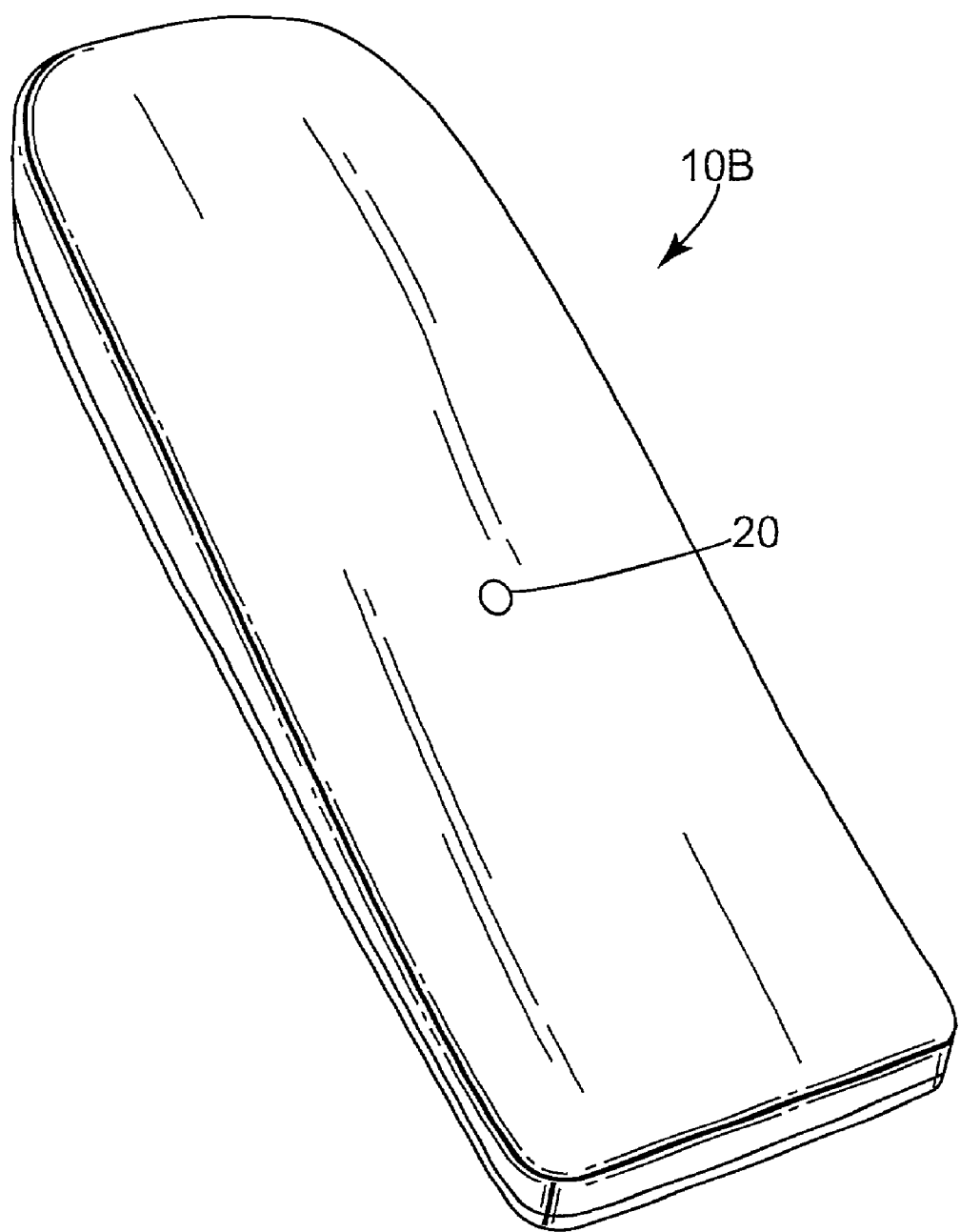
FIG. 1B is a perspective view of an alternative embodiment of a cellular telephone including an optical, motion translation type screen pointer device positioned on a back side of the telephone.

FIG. 1B is a perspective view illustrating a back surface of an alternative embodiment of the portable electronic device shown in FIG. 1A. Cellular telephone 10B shown in FIG. 1B is substantially the same as cellular telephone 10A shown in FIG. 1A, with the exception that motion detection device 20 is positioned on a back surface of cellular telephone 10B, whereas motion detection device 20 is positioned on a front surface of cellular telephone 10A. By positioning motion detection device 20 on a back surface of cellular telephone 10B, cellular telephone 10B may be operated in a manner similar to a conventional mouse. Cellular telephone 10B may rubbed against a work surface or an imaging surface, such as a desktop, pants leg, a wall, or any other relatively flat surface, to highlight and select particular menu items 18A–18C. Motion detection device 20 may also be operated as described with reference to FIG. 1A, such as by sliding the user's hand or finger across motion detection device 20.

It will be understood that multiple motion detection devices 20 may be used in a portable electronic device 10. In one embodiment, a motion detection device 20 is positioned on both a front and a back surface of a portable electronic device 10, to allow a user the option of using a finger to control menu item selection, or using the device 10 itself to control menu item selection. It will also be understood that it is the relative motion between motion detection device 20 and a work surface or imaging surface that generates movement of highlight bar 16, and that such movement may be generated either by moving a surface relative to motion detection device 20, or by moving motion detection device 20 relative to a surface.

In one embodiment, if motion detection device 20 of cellular telephone 10B is moved upward against a work surface, highlight bar 16 moves upward through menu items 18A–18C. If motion detection device 20 is moved downward against a work surface, highlight bar 16 moves downward through menu items 18A–18C. After a desired one of the menu items 18A–18C has been highlighted with highlight bar 16, the highlighted menu item is then selected. In one embodiment, a highlighted menu item is selected by moving motion detection device 20 against a work surface in either a leftward or rightward direction. After a highlighted menu item has been selected by a user, cellular telephone 10A automatically dials the selected phone number, or the phone number associated with the selected name.

In one form of the present invention, portable electronic device 10 includes a security feature that requires a user to enter a "gestural password" before using the device 10. A gestural password is similar to textual passwords, which are typically used in computer systems and other electronic devices. But rather than entering alphanumeric text to identify a particular user, a gestural password is a movement pattern (e.g., circle, Figuer 8, spiral, square, etc.) that is entered using motion detection device 20. An appropriate prompt may be provided on display 14 to indicate that the user is to enter a gestural password. In one embodiment, a user's gestural password is stored in portable electronic device 10, and operation of the device 10 is enabled only after the user moves portable electronic device 10 (and correspondingly motion detection device 20) in a pattern that matches the stored gestural password.

Figure 2:
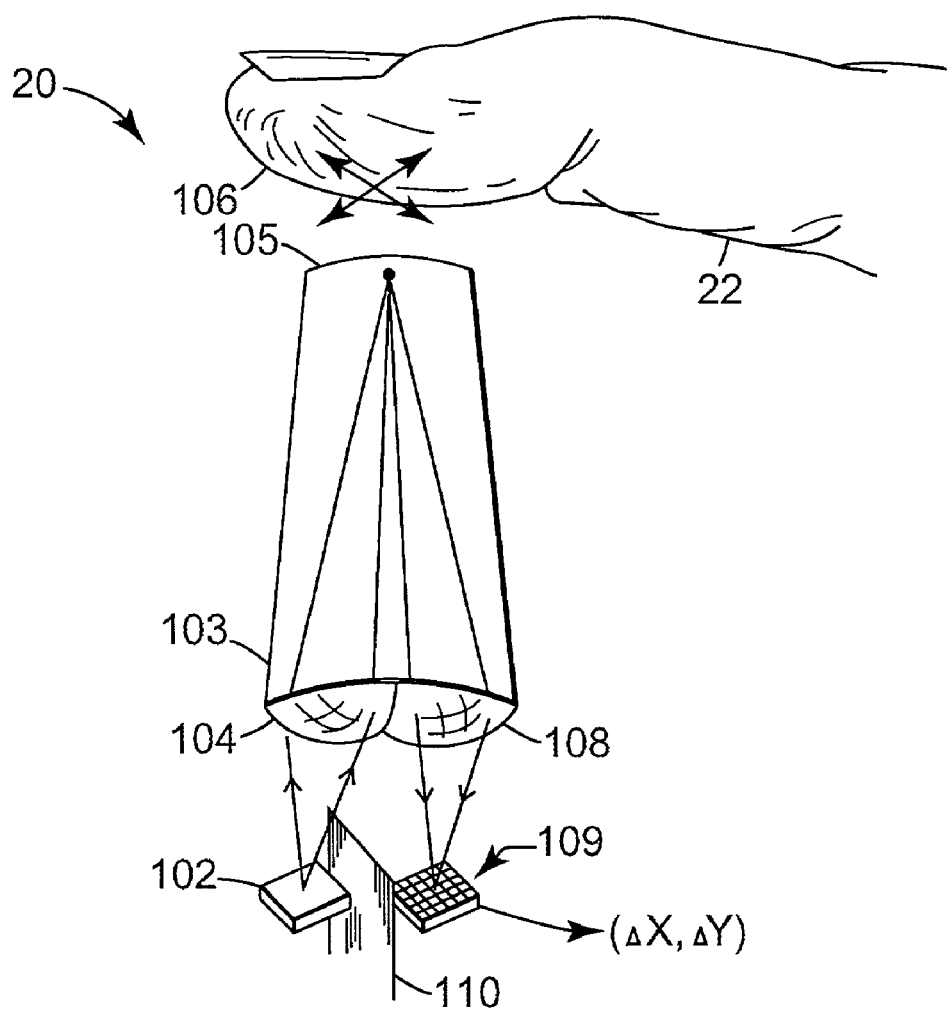
FIG. 2 is a pictographic side view of the main components of one embodiment of an optical, motion translation type screen pointer device according to the present invention.

FIG. 2 shows a simplified representation of a side view of a motion detection device 20 suitable for tracking the two-dimensional relative movement of a work surface or an imaging surface, such as human finger 22, which is pressed against a surface 105 of a transparent stud 103. Although motion detection device 20 is described in the context of a human finger 22 as the imaging surface, it will be understood that motion detection device can be used on any suitable imaging surface, such as a desktop, a wall, a pants leg, or any other surface that is relatively flat and conveniently available to the user of the portable electronic device 10. A motion detection device like that shown in FIG. 2 is described in detail in U.S. Pat. No. 6,057,540 (the '540 patent), which is incorporated by reference. The operation of motion detection device 20 is also summarized below.

A light source 102, which is an LED in one embodiment, emits light that is gathered and focused by lens 104 to illuminate surface 105. Surface 105 may be flat, or preferably, have a slight curvature. Curvature aids in enlarging the size of the region of surface 105 that is in focus for the motion detector 109 described below. Surface 105 may be a glass or other wear resistant coating applied to the end of transparent stud 103. In one form of the present invention, surface 105 is about 3/16 to 1/4 of an inch in diameter, and the length of transparent stud 103 ranges from about 3/8 to 3/4 of an inch. Another term that is descriptive of transparent stud 103 is "rod lens". Opaque barrier 110 keeps stray light from LED 102 from reaching motion detector 109.

When the tip 106 of finger 22 is pressed against surface 105, the ridges of skin and any other micro texture features are visible in the plane of surface 105, just as if they were a part of surface 105. Lens 108 focuses light from those features onto an array of photo detectors, which is part of movement sensor 109. Movement sensor 109 automatically acquires and tracks any suitable image. When tracking an image, movement sensor 109 produces incremental (X, Y) signals.

Lifting fingertip 106 away from surface 105 by even a few thousandths of an inch defocuses the image and produces a loss of tracking. This condition is detected within motion detector 109, and in one embodiment, the production of incremental (X, Y) signals ceases. This has the effect of leaving highlight bar 16 unchanged at whatever location it currently occupies, and is exactly the same as when a user of a mouse removes his hand from the mouse. When fingertip 106 is subsequently replaced on surface 105, motion detector 109 appreciates that an image has been acquired, and, in one embodiment, treats that acquisition as though a reset has been performed. That is, until there has been new motion subsequent to the new acquisition, the incremental coordinates (X, Y) will have the value (0, 0). This leaves the existing position of highlight bar 16 undisturbed until such time as it is deliberately moved by the motion of fingertip 106, and corresponds exactly to a mouse user's placement of his hand back on the mouse without moving it.

Motion sensor 109 uses exactly or substantially the same technique as the imaging and navigation arrangement described in the incorporated Patents. In the particular operational settings described therein, it was desirable that there be some magnification of the image before it reached the sensor, because of the small size of the micro-features being imaged and tracked (e.g., paper fibers). Here, the features on fingertip 106 are really quite large in comparison, so that magnification is not used in one embodiment. In alternative embodiments, magnification is used. Even though one form of an imaging and navigation mechanism is described in the incorporated patents, a brief overview of the technique is provided below.

An LED 102, which is an IR LED in one embodiment, emits light that is projected by lens 104 onto a region 105 that is part of a work surface 106 to be imaged for navigation. In one form of the present invention, motion sensor 109 is an integrated circuit (IC) having an array of photo detectors, memory, and arithmetic circuits arranged to implement image correlation and tracking functions described herein and in the incorporated patents. An image of the illuminated region 106 is projected through an optical window (which may be transparent stud 3 itself) to a package (not shown) of integrated circuit 109 and onto the array of photo detectors. Lens 108 aids in the projection of the image onto the photo detectors.

One preferred optical navigation technique according to the present invention optically detects motion by directly imaging as an array of pixels the various particular optical features visible at surface 105, much as human vision is believed to do. IR light reflected from a textured work surface pressed against surface 105 is focused onto a suitable array (e.g., 16×16 or 24×24) of photo detectors. The responses of the individual photo detectors are digitized to a suitable resolution (e.g., six or eight bits) and stored as a frame into corresponding locations within an array of memory. In one embodiment, each pixel in a frame corresponds to one of the photo detectors.

The overall size of the array of photo detectors is preferably large enough to receive an image having several features (e.g., ridges in the whorls of skin). In this way, images of such spatial features produce translated patterns of pixel information as fingertip 106 moves. The number of photo detectors in the array and the frame rate at which their contents are digitized and captured cooperate to influence how fast fingertip 106 can be moved over surface 105 and still be tracked. Tracking is accomplished by comparing a newly captured sample frame with a previously captured reference frame to ascertain the direction and amount of movement.

In one embodiment, the entire content of one of the frames is shifted by a distance of one pixel successively in each of the eight directions allowed by a one pixel offset trial shift (one over, one over and one down, one down, one up, one up and one over, one over in the other direction, etc.). That adds up to eight trials. Also, since there might not have been any motion, a ninth trial "null shift" is also used. After each trial shift, those portions of the frames that overlap each other are subtracted on a pixel by pixel basis, and the resulting differences are preferably squared and then summed to form a measure of similarity (correlation) within that region of overlap. Larger trial shifts are possible, of course (e.g., two over and one down), but at some point the attendant complexity ruins the advantage, and it is preferable to simply have a sufficiently high frame rate with small trial shifts. The trial shift with the least difference (greatest correlation) can be taken as an indication of the motion between the two frames. That is, it provides raw movement information that may be scaled and or accumulated to provide highlight bar movement information ($\Delta X$ and $\Delta Y$) of a convenient granularity and at a suitable rate of information exchange.

Sensor 109 automatically detects when fingertip 106 has been removed from surface 105, by sensing that all or a majority of the pixels in the image have "gone dark." The process is actually somewhat more complicated than that, as explained below.

When fingertip 106 is removed from surface 105, the IR light from the illuminating LED 102 no longer reaches the photo detectors in the same quantity that it did previously, if at all; the reflecting surface is too far away or is simply not in view. However, if fingertip 106 is removed and the surface 105 is exposed to an intensely lit environment as a result, then the outputs of the photo detectors might be at any level. The key is that the outputs of the photo detectors will be uniform, or nearly so. The main reason that the outputs become uniform is that there is no longer a focused image. All of the image features are indistinct and they are each spread out over the entire collection of photo detectors. Therefore, the photo detectors uniformly come to some average level. This is in distinct contrast with the case when there is a focused image. In the focused case, the correlations between frames (recall the one over, one over and one down, etc.) exhibit a distinct phenomenon.

In operation, images should be acquired at a rate sufficient that successive images differ in distance by no more that perhaps a quarter of the width of the array, or 4 pixels for a 16×16 array of photo sensors. Experiments show that a finger speed of 50 mm/sec is not unreasonable. With 1:1 imaging, this corresponds to a speed at the array of 800 pixels per second. To meet a requirement of not moving more than four pixels per cycle, a measurement rate of 200 samples per second is needed. This rate is quite practical, and it may be desirable to operate at several times this rate.

Figure 3:
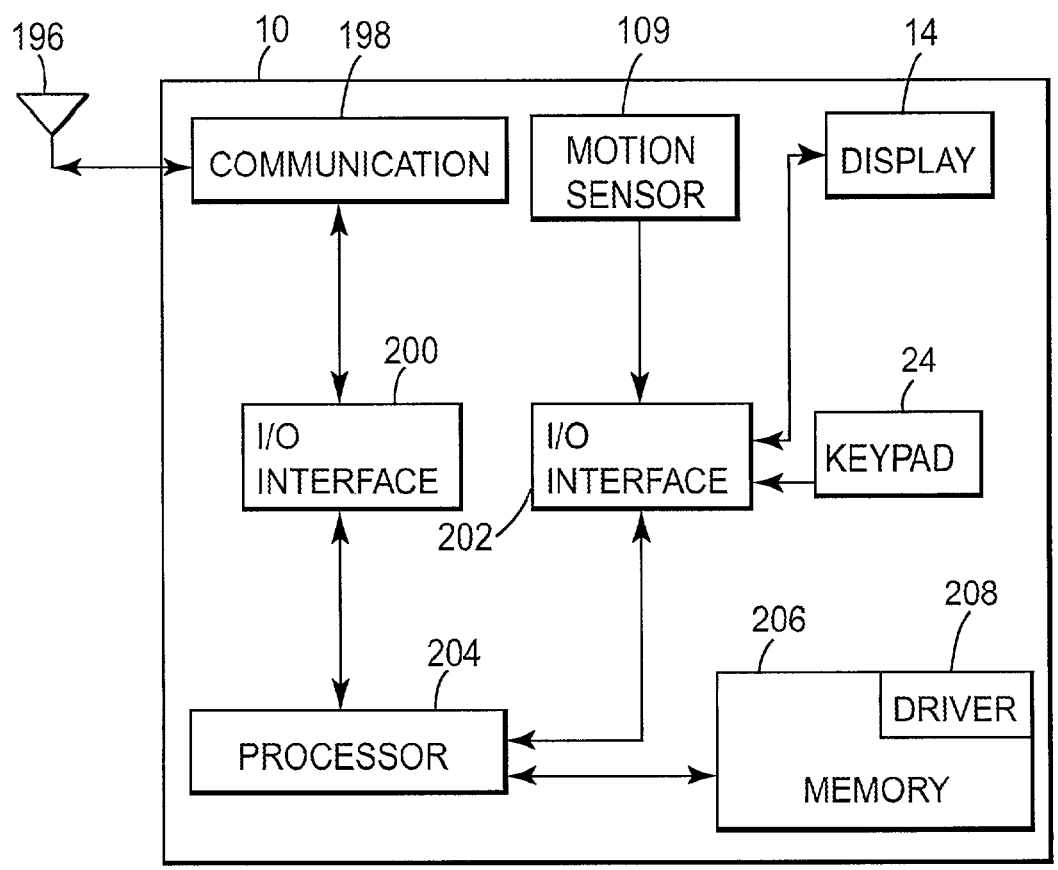
FIG. 3 is an electrical block diagram of major components of the cellular telephones shown in FIGS. 1 and 2.

FIG. 3 is an electrical block diagram illustrating the major components of a portable electronic device 10, such as cellular telephone 10A or 10B. Portable electronic device 10 includes antenna 196, communications circuitry 198, motion sensor 109, display 14, input/output (I/O) interface 200, I/O interface 202, keypad 24, processor 204, and memory 206. Motion sensor 109, display 14, and keypad 24 are each coupled to I/O interface 202. I/O interface 202 is also coupled to processor 204. Processor 204 communicates with motion sensor 109, display 14, and keypad 24, via I/O interface 202. Processor 204 is also coupled to memory 206. In one embodiment, driver 208 is stored in memory 206. Processor 204 uses driver 208 to control highlight bar 16 on display 14 based on movement data received from motion sensor 109.

Communications are sent and received by device 10 via antenna 196. Antenna 196 is coupled to communications circuitry 198. Communications circuitry 198 includes standard communications components known to those of ordinary skill in the art, such as amplifiers, analog-to-digital converters, digital-to-analog converters, modulators, and demodulators. Processor 204 is coupled to communications circuitry 198 via I/O interface 200.

In one form of the present invention, processor 204 receives incremental (X, Y) signals from motion sensor 109, indicating relative movement between motion detection device 20 and a work surface. Using driver 208, processor 204 processes the received incremental (X, Y) signals, and takes appropriate action. Using cellular telephone 10A as an example, if finger 22 is moved upward against motion detection device 20, processor 204 receives incremental (X, Y) signals from motion sensor 109 indicative of this upward movement. In response, processor 204 causes highlight bar 16 on display 14 to move upward through menu items 18A–18C. If finger 22 is moved downward against motion detection device 20, processor 204 receives incremental (X, Y) signals from motion sensor 109 indicative of this downward movement. In response, processor 204 causes highlight bar 16 on display 14 to move downward through menu items 18A–18C. If the received incremental (X, Y) signals from motion sensor 109 indicate leftward or rightward movement of finger 22 against motion detection device 20, processor 204 causes communications circuitry 198 to dial the phone number associated with the currently highlighted menu item. In one embodiment, processor 204 distinguishes between relatively small leftward or rightward movements, which may occur when a user is scrolling upward or downward through menu items, and larger leftward or rightward movements, which indicate that the user desires to select a highlighted menu item.

In one form of the present invention, portable electronic device 10 includes a security feature that requires a user to enter a "gestural password" before using the device 10. To use this security feature, a user enters a movement pattern representing the user's password using motion detection device 20. Movement pattern data representing the entered movement is stored in memory 206. In one form of the invention, after a gestural password has been entered by a user and stored in memory 206, operation of device 10 is enabled only after the user moves portable electronic device 10 (and correspondingly motion detection device 20) against a work surface in a pattern that matches the stored gestural password. Processor 204 compares entered gestural passwords with movement pattern data stored in memory 206, and determines whether the movements match. In one embodiment, processor 204 uses conventional pattern matching techniques to identify whether the movements match.

A user may be required to enter the user's gestural password when device 10 is first powered on, prior to each use of device 10, or other timing may be used. This security feature of device 10 prevents operation of device 10 if it is lost or stolen. In addition, the security feature may be used to identify multiple users of a particular portable electronic device 10, for billing purposes or other reasons. For example, multiple gestural passwords associated with multiple users may be stored in device 10. Each user would be required to enter the user's gestural password prior to operating device 10.

In one form of the present invention, a user may enter free hand drawings into portable electronic device 10 by moving device 10 (and correspondingly motion detection device 20) against a work surface, or by moving finger 22 against motion detection device 20. Entered drawings may be used to annotate or create facsimile documents, or may represent user signatures that may be used to verify electronic transactions.

It will be understood by a person of ordinary skill in the art that functions performed by portable electronic device 10 may be implemented in hardware, software, firmware, or any combination thereof. The implementation may be via a microprocessor, programmable logic device, or state machine. Components of the present invention may reside in software on one or more computer-readable mediums. The term computer-readable medium as used herein is defined to include any kind of memory, volatile or non-volatile, such as floppy disks, hard disks, CD-ROMs, flash memory, read-only memory (ROM), and random access memory.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A method of controlling menu item selection in a portable electronic device, the portable electronic device including a menu display having a plurality of menu items and a menu item pointer movable by a user to highlight particular menu items, the method comprising:
   sensing two-dimensional relative movement between the portable electronic device and an imaging surface with a motion detection device;
   generating a first set of movement data with the motion detection device indicating an amount and direction of a first relative movement between the portable electronic device and the imaging surface;
   moving the menu item pointer based on the first set of movement data to highlight a first menu item;
   generating a second set of movement data with the motion detection device indicating an amount and direction of a second relative movement between the portable electronic device and the imaging surface; and
   selecting the first menu item based on the second set of movement data.

2. The method of claim 1, wherein the first set of movement data indicates movement in a first direction, and the second set of movement data indicates movement in a second direction, the second direction being substantially perpendicular to the first direction.

3. The method of claim 1, and further comprising:
   directing light onto the imaging surface, thereby generating reflected images;
   focusing the reflected images onto an array of photo detectors;
   generating digital representations of the reflected images based on outputs of the photo detectors; and
   correlating at least one version of a first one of the digital representations with at least one version of a second one of the digital representations.

4. The method of claim 1, wherein the portable electronic device is one of a cellular telephone, personal digital assistant, digital camera, pager, portable music player, and portable game device.

5. A portable electronic device comprising:
a menu display having a plurality of menu items and a menu item pointer movable by a user to highlight particular menu items;
a motion detection device for sensing relative movement between the portable electronic device and an imaging surface, the motion detection device configured to generate a first set of movement data indicating an amount and direction of a first relative movement between the portable electronic device and the imaging surface, and configured to generate a second set of movement data indicating an amount and direction of a second relative movement between the portable electronic device and the imaging surface; and
a controller configured to move the menu item pointer based on the first set of movement data to highlight a first menu item, the controller configured to select the first menu item based on the second set of movement data.

6. The device of claim 5, wherein the first set of movement data indicates movement in a first direction, and the second set of movement data indicates movement in a second direction, the second direction being substantially perpendicular to the first direction.

7. The device of claim 5, wherein the motion detection device is an optical motion detection device.

8. The device of claim 7, wherein the optical motion detection device further comprises:
a light source for illuminating the imaging surface, thereby generating reflected images;
an array of photo detectors;
a lens for focusing the reflected images onto the array of photo detectors; and
wherein the optical motion detection device is configured to generate digital representations of the reflected images based on outputs of the photo detectors and correlate at least one version of a first one of the digital representations with at least one version of a second one of the digital representations.

9. The device of claim 5, wherein the motion detection device is positioned on a back side of the portable electronic device, and the menu display is positioned on a front side of the portable electronic device.

10. The device of claim 5, wherein the portable electronic device is one of a cellular telephone, personal digital assistant, digital camera, pager, portable music player, and portable game device.

11. A method of identifying the user of a portable electronic device, the method comprising:
storing movement pattern data representing a first pattern of relative movement between the portable electronic device and an imaging surface;
sensing relative movement between the portable electronic device and an imaging surface;
generating a first set of motion data based on the sensed relative movement, the first set of motion data representing a second pattern of relative movement between the portable electronic device and an imaging surface;
comparing the first set of motion data to the stored movement pattern data; and
identifying the user of the portable electronic device based on the comparison of the first set of motion data to the stored movement pattern data.

12. The method of claim 11, and further comprising:
directing light onto the imaging surface, thereby generating reflected images;
focusing the reflected images onto an array of photo detectors;
generating digital representations of the reflected images based on outputs of the photo detectors; and
correlating at least one version of a first one of the digital representations with at least one version of a second one of the digital representations.

13. The method of claim 11, and further comprising:
enabling operation of the portable electronic device if the first set of motion data matches the stored movement pattern data.

14. A portable electronic device comprising:
a memory for storing movement pattern data representing a first pattern of relative movement between the portable electronic device and an imaging surface;
a motion detection device for generating a first set of motion data representing a second pattern of relative movement between the portable electronic device and an imaging surface; and
a controller for comparing the first set of motion data to the stored movement pattern data, the controller configured to identify the user of the portable electronic based on the comparison of the first set of motion data to the stored movement pattern data.

15. The device of claim 14, wherein the motion detection device is an optical motion detection device.

16. The device of claim 15, wherein the optical motion detection device further comprises:
a light source for illuminating the imaging surface, thereby generating reflected images;
an array of photo detectors;
a lens for focusing the reflected images onto the array of photo detectors; and
wherein the optical motion detection device is configured to generate digital representations of the reflected images based on outputs of the photo detectors and correlate at least one version of a first one of the digital representations with at least one version of a second one of the digital representations.

17. The device of claim 14, wherein the motion detection device is positioned on a back side of the portable electronic device.

18. A portable electronic device comprising:
a memory for storing movement pattern data representing a first pattern of relative movement between the portable electronic device and an imaging surface;
a motion detection device for generating a first set of motion data representing a second pattern of relative movement between the portable electronic device and an imaging surface; and
a controller for comparing the first set of motion data to the stored movement pattern data, the controller configured to enable operation of the portable electronic device if the first set of motion data matches the stored movement pattern data.

19. The device of claim 18, wherein the motion detection device is an optical motion detection device.

20. The device of claim 19, wherein the motion detection device further comprises:
a light source for illuminating the imaging surface, thereby generating reflected images;
an array of photo detectors;
a lens for focusing the reflected images onto the array of photo detectors; and
wherein the motion detection device is configured to generate digital representations of the reflected images based on outputs of the photo detectors and correlate at least one version of a first one of the digital representations with at least one version of a second one of the digital representations.

21. The device of claim 18, wherein the motion detection device is positioned on a back side of the portable electronic device.

22. The device of claim 18, wherein the portable electronic device is one of a cellular telephone, personal digital assistant, digital camera, pager, portable music player, and portable game device.

* * * * *